Patented Jan. 18, 1949

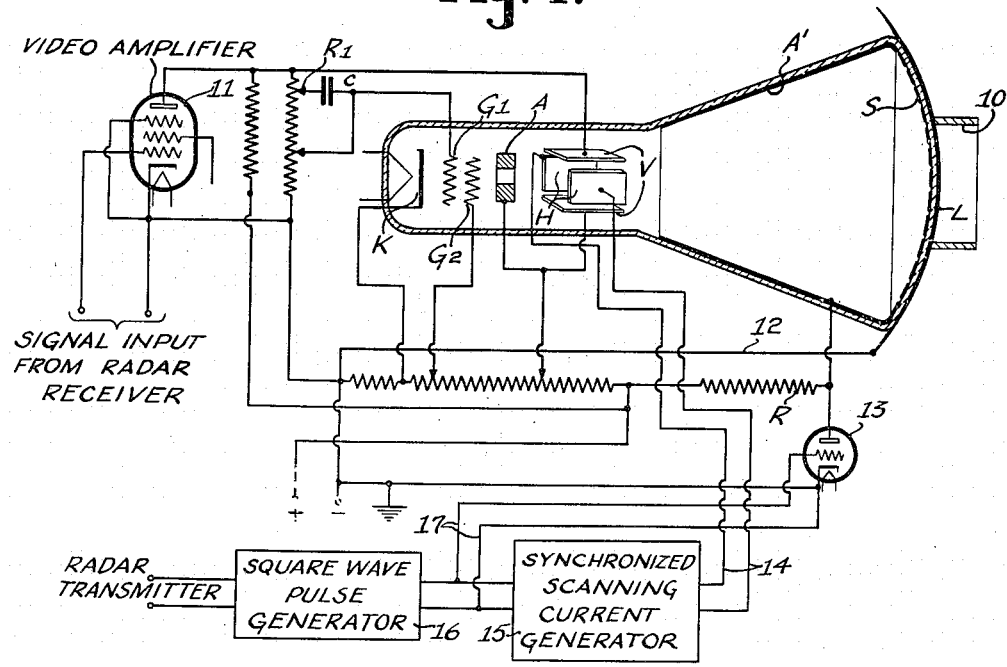
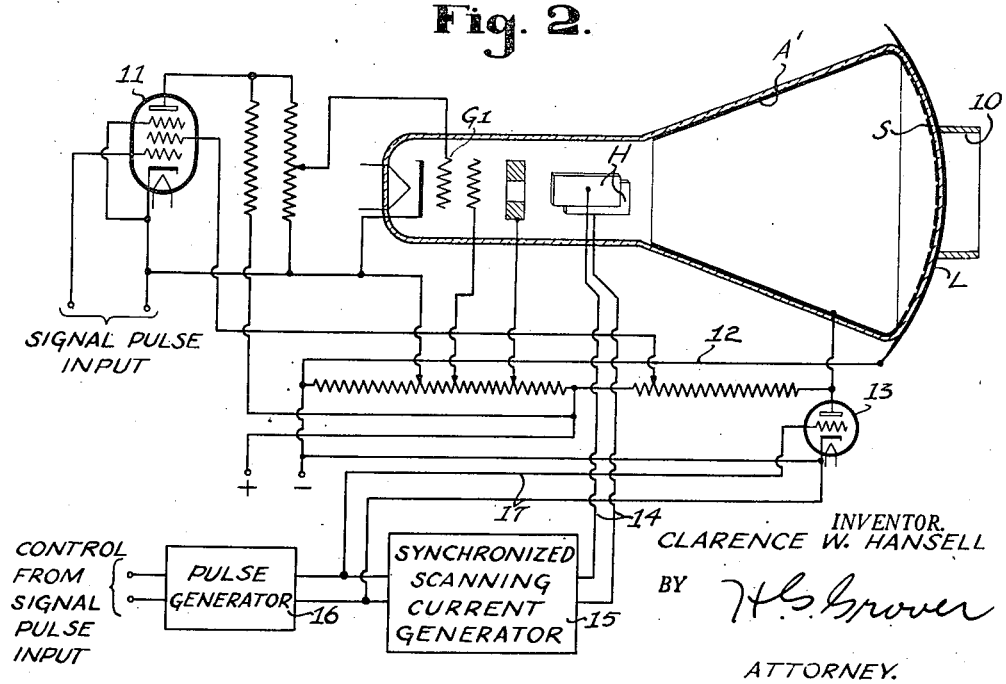

2,459,319

UNITED STATES PATENT OFFICE 2,459,319

CATHODE-RAY OSCILLOSCOPE

Clarence W. Hansell, Port Jefferson, N. Y., assignor to Radio Corporation of America, a corporation of Delaware Application October 11, 1944, Serial No. 558,200

19 Claims. (Cl. 315—30)

The present invention relates to improvements in systems employing cathode ray tubes for visibly indicating recurring electrical waves.

The invention finds particular usefulness in radio locating systems employing short duration pulses which when reflected from an object to be detected appear as a modulation in intensity or as a deflection of an electron beam on the cathode ray oscilloscope. However, it should be understood that the invention is not limited to the foregoing use since it is applicable to any system employing a cathode ray oscilloscope for visibly indicating synchronously repetitive electrical phenomenon.

One difficulty commonly experienced in radio locating systems employing pulses of radio frequency energy is that the maximum range of detection is limited by the receiver noise. The receiver noise has a relatively large amount of energy because the pass band is wide and the nature of the system is such that it has not seemed possible to employ pulse rate selectivity after final detection for the purpose of discriminating between the desired pulse and noise. This follows from the fact that in such systems (sometimes referred to as radar systems) it is desired that all the echo (reflected) signals from objects over a large range of distances be viewed at the same time. Noise and interference, the peaks of which occur at random time intervals, appears on the fluorescent screen of the oscilloscope, thereby causing confusion to the viewer. It is therefore desirable to provide a system which will lift the returning (echo or reflected) pulses out of noise and interference to thereby provide a clear distinction between desired signal pulses and undesired noise and interference.

It is an object of the present invention to obtain an improved signal-to-noise ratio in the light response of the screen of a cathode ray oscilloscope.

Another object is to obtain response characteristics in oscilloscopes analogous to frequency selectivity in conventional electrical circuits and analogous to pulse rate selectivity in pulse communications systems.

A further object is to obtain a regenerative timing and frequency selective response characteristic in a cathode ray oscilloscope over a broad range of repeating time intervals.

In one typical form of radar signal presentation by means of an oscilloscope, the transmitter pulse causes the cathode ray beam to start moving at a uniform rate in one direction across the fluorescent screen while returning reflected waves and noise cause deflections of the beam at right angles to the uniform sweep. In this manner deflections or "pips" due to returning waves reflected from an object have a position along the scanning line which is a measure of the distance to the object. This is called type A indication, in the radar art.

In another form of radar signal indication the radar system rotates and sends and receives beams in a succession of directions. The oscilloscope electron beam is then made to deflect from a central point at a uniform rate and in a direction corresponding to the rotational position of the system. The returning reflected waves and the noise then modulate the intensity of the electron stream. This type of indication presents a map of the area around the radar system as a center and is called plan-position indication, or PPI.

In either type of indication, the presence of reflecting objects is indicated by an increase in the light emanating from certain areas of the fluorescent screen, and in both cases the noise also tends to produce light which makes it hard to distinguish weak reflected waves.

The present invention makes it possible to distinguish reflected waves from noise down to much lower values of the reflected waves by making each area of the fluorescent screen respond more and more strongly in production of light the more persistently it is struck by increased electron beam currents due to the reflected waves which repeat at a fixed or only slowly moving part of the screen.

This is accomplished by causing the noise to be balanced in such a way as to cause each area of the screen which is affected only by the noise to remain at a relatively low potential whereas addition of current to any one area by the recurring effect of waves reflected from an object will cause this one area of the screen to rise in potential at successive time intervals in a manner to give much increased output of light in response to the reflected waves as compared with the light due to noise alone.

For this purpose, means are provided to keep the fluorescent screen at a relatively low potential and to cause areas responding to reflected waves to increase in potential, due to the known tendency for secondary emission from bombardment of the screen to cause the bombarded area to rise toward the potential of the second anode, as a result of which secondary electrons are pulled away from the screen.

This phenomenon which I utilize in the present invention is the reason why the screens of ordinary oscilloscopes rise to and remain at nearly the potential of the nearby second anode even though the screen of the ordinary oscilloscope has no electrical connection to it and is in fact a good electrical insulator.

To explain the phenomenon in greater detail, let us suppose that the whole area of the fluorescent screen of an oscilloscope is bombarded by electrons while the second anode (i. e. anode nearest the screen) is held at a relatively low potential. The whole area of the screen will then tend to assume the same potential as the second anode within 50 or 100 volts. This comes about because each small area of the screen either collects, or releases, electrons until the number of bombarding electrons arriving and the number released due to secondary emission, and pulled away, are equal. The equilibrium condition is likely to be attained when the potential of the area of the screen is from 50 to 100 volts lower, with respect to the cathode, than the potential of the second anode, depending upon the electric field conditions, position of the area and its secondary emission characteristics.

Assuming now that the dielectric capacity of the screen to surrounding constant potential objects or to "ground" is much larger than its capacity to the second anode we may, after the bombarding electron current is turned off, raise the second anode potential to a much higher value than before without causing a corresponding increase in screen potential. This places the screen potential at a value which is far from its equilibrium potential under electron bombardment. The screen potential is now much below the equilibrium potential. Having established this condition, if we now allow a small electron current to flow to and bombard a small area of the screen, this small area will release more secondary electrons to be pulled to the second anode than the number of primary electrons. The resulting current flow causes this one bombarded area to rise progressively in potential toward the much higher equilibrium potential. The potential rise is accompanied by a corresponding progressive increase in light emission. As a consequence, the intensity of light emitted becomes a function both of electron beam current to the area and of the time during which this current flows. This is to be contrasted with the behavior of oscilloscopes as commonly used where the light intensity is primarily a function of the beam current and relatively little affected by the time during which this current flows.

It may be noted that as the one bombarded area increases in potential under bombardment, it establishes a strong electric field between itself and surrounding areas. This electric field acts in a direction tending to decrease the bombardment area, or to prevent its spreading, which is an aid to obtaining sharply focussed electron beams.

The limit of increase in light emission, in response to a given bombarding current, will, of course, be reached if the area is bombarded long enough to cause the potential of the area to reach the equilibrium potential. In practice it is therefore desirable to so limit the product of current and time of flow of current to any one indicating area that only signals which are considerably stronger than noise can cause the equilibrium potential to be reached.

However, it is desirable that signals which are considerably stronger than noise be limited in the amount of light emission they cause so that excessive light will not be produced and weaker signals will not tend to be masked by it.

All of these conditions are readily satisfied by proper design and adjustment of equipment to utilize the present invention.

In the operation of the present invention, I arrange to bombard the screen with electrons while keeping the second anode potential low during time periods when no signals are to be received, and high during time periods when signals are to be received, so that the screen potential averages low in response to noise, but higher in response to signals added to the noise. For this particular condition of operation, the noise will hold some very low level of average illumination. If now a receiving signal wave (such as a pulse) is added to the noise, the beam current to a particular area on the screen will increase, thus increasing the net flow of electrons from this area, as a result of which the average charging and discharging currents to the area no longer balance and the average potential on the area will rise. Hence, the emission of light from this area will also rise and increase progressively with the passages of the beam current. The noise pulses are random in timing and amplitude and will not repeat consistently with the same amplitude and at the same area on the screen. The signal pulses, however, do occur with more nearly the same amplitude and repeat at equally spaced time intervals and for this reason it will be evident that the area of the screen which shows the noise will not be as bright as those other areas which have desired signal pulses repeatedly added to the noise. The potential of the area on the screen receiving the signal, and the light emission from it, will continue to increase until forces intervene to slow up and then stop the rise. One of these forces is the decreasing secondary emission ratio as the impact potentials rise, and another force is the tendency for the electrons in the screen discharging current, while the second anode potential is low, to be pulled toward screen areas of higher potential. The result of adding a signal current to noise current is to cause an increased light from areas receiving the signal current, whose amount increases with time in the manner analogous to building up of current in the resonant output circuit of a class C amplifier. After the signal is removed, light from the area will persist for a time in decreasing intensity, as electrons from the discharging electron spray discharge the area. Thus both the build-up and decay of light emission are analogous to build-up and decay of current in a tuned circuit in response to pulses of current repeated at the resonant frequency.

It should be noted at this time that one of the differences between the oscilloscope system of the present invention and conventional oscilloscope systems is that the oscilloscope of the invention gives increasing light response at successive repetitions up to a point where the time of rise and decay becomes so slow as to be objectionable, whereas known types of oscilloscopes give more nearly full obtainable response at each received pulse. It is believed that the present invention can tolerate a time for build-up, or decay, to with 1/e of final values of perhaps 1/30 of a second, corresponding to 63% response to 15 cycle modulation of pulse amplitude. The improvement in signal-to-noise amplitude ratio may therefore be roughly equal to the number of signal pulses received in 1/30th of a second. For a pulse repetition rate of 3,000 per second, corresponding to a maximum radar range of 50,000 meters, (31 miles), the improvement would theoretically approach 100 to 1 in amplitude, or 10,000 to 1 in power.

In this connection it may be noted that experience with ordinary radar systems has shown that the apparent signal-to-noise ratio increases very little, if at all, when the average transmitted power is increased by increasing the pulse rate. This is because signal and noise power effective at the oscilloscope screen increase together with increase in number of repetitions and there is no increase in timing or frequency selectivity. Using the present invention, however, the added timing selectivity makes possible an improvement in effective, or apparent, signal-to-noise ratio as the repetition rate is increased.

It should be understood that the foregoing theoretical explanations have been given merely for the purpose of exposition in order that the invention may be better appreciated. While these theoretical explanations are believed to be correct, they are not of necessity complete, nor does the operation of the invention depend upon their accuracy or otherwise.

The features of the invention and objects, other than those stated above, will appear from a reading of the following description which is accompanied by a drawing wherein:

Fig. 1 illustrates one embodiment of the invention applicable to a radio locating (radar) system, and Fig. 2 illustrates a modification of Fig. 1 which has wider application and can be used for the purpose of visibly indicating repeating electrical waves.

In the two figures of the drawing, the same parts are represented by the same reference numbers.

Inasmuch as the system of Fig. 1 is to be used in connection with a radio locating (radar) system, it is believed to be helpful to give a short description of a well known type of radar system with which this invention can be used. The radar system transmits pulses of radio frequency energy which are very short compared to the time intervals between them. During the transmission of these short pulses, it has been customary to cut-off or block the receiver of the radar system in order to prevent paralyzing the receiver. After the pulses have been sent, they will continue on straight paths until they strike an object, such as an airplane, from which they will be reflected or bounced back to the transmission point at which the receiver of the radar system is located. These reflected or echo pulses return to the receiver during the time interval between transmitted pulses. The time interval between the transmission of the original pulse and the reception of the echo is observed or measured and translated into the distance to the object.

Turning now to the drawing, the cathode ray tube is shown as having a cathode K, first and second grids G1 and G2, a focusing anode A, vertical deflection plates V and horizontal deflection plates H, a second anode A', and insulated fluorescent screen S, and a light translucent conducting layer L which is laid over the screen S. The layer L may be placed over the outside of standard tubes. Its purpose is to provide a relatively large dielectric capacity between itself and each area of the screen so that the potential of the screen will not follow variations in potential of the second anode A'. A viewing hood or light shade 10 is used to aid in viewing the visible indications on the screen. It is preferably connected to and held at the same low or zero potential as the translucent conducting layer L.

The vertical deflection plates V are connected to the output of a video amplifier 11 whose control grid is connected to the output of a radio locating (radar) receiver. The translucent backing or conducting layer L is maintained at some relatively low and constant potential with respect to the cathode by means of connection 12. The second anode A' is maintained at a potential which is positive relative to the cathode and is connected to the anode of the modulator tube 13. The horizontal deflection plates H are connected by means of leads 14 to the output of a synchronized scanning current generator 15. Generator 15 is controlled from the output of a square wave pulse generator 16 which in turn is coupled to and controlled by the output of the radio locating (radar) transmitter.

By means of suitable adjustments of the radar system, the square wave pulse generator 16 produces a rectangular wave pulse whose duration is equal to the time it takes an originally transmitted pulse to travel the maximum range to an object to be detected and back to the original transmission point. Because of the fact that the synchronized scanning current generator 15 is coupled to the output of the pulse generator 16, the sawtooth wave produced by the scanning generator 15 will have a linear slope of a duration substantially identical with the duration of the square wave pulse produced by generator 16. The control grid and the cathode of the modulator tube 13 are connected by means of leads 17 to the output of the square wave pulse generator from which it receives a negative pulse of a magnitude sufficient to block or cut-off the flow of current through the tube 13 for an interval of time corresponding to the duration of the output pulse from 16. In the interval between the end of the pulse produced by generator 16 and the beginning of the succeeding pulse produced by generator 16, the modulator tube 13 will conduct current. It will thus be seen that the second anode A' which pulls secondary electrons from the screen S is keyed in potential by the modulator tube 13 synchronously with the horizontal scanning sweep from the generator 15 in such a way that the second anode A' has a low potential during idle periods but some much higher potential during the time of the scanning sweep. This follows from the fact that during the time the modulator tube 13 is conducting, which occurs in time intervals between pulses from the output of generator 16, the flow of current through this tube will produce an IR drop in resistor R of a value which will reduce the potential on the second anode A'; while during the time the modulator tube 13 is non-conducting, which occurs during the time that the generator 16 is producing a pulse, there will be no flow of current through resistor R and the potential on the second anode A' will be a maximum. In the foregoing discussion it has been assumed that the focusing system has been so designed as to give focusing of the electron beam in the cathode tube when the potential of the second anode A' is high and the potential of the screen S is fairly low. Consequently the electron stream from cathode K through first anode A will be a well defined spot tracing out a pattern in response to potentials on deflecting plates H and V when the potential on second anode A' is high, but will be more or less spread out over the screen when the potential on second anode A' is low.

Under the foregoing conditions, the screen as a whole may be made to assume a relatively low potential but any area of the screen S which is under the scanning spot tends to rise in potential toward the potential of the second anode A'. This is because the impact of the beam at a particular area on the screen S will cause secondary emission from this area, as a result of which the secondary electrons knocked out from the screen which are of negative charge flow to the second anode A', thus leaving positive potentials on this screen area and causing a rise in potential of this area. The area of the screen thus struck by the electrons will rise toward a more positive potential whose uppermost limit is near the positive potential on the second anode A'. During the intervals between the times the echo pulses can be received (that is, in those idle intervals when there are no spots on the screen from echo signals), the screen potential on each elemental area will tend to decrease toward the value placed on the second anode A' by the tube 13, which is now conducting. Because each elemental screen area has dielectric capacity to the underlying conducting layer L, this capacity tends to accumulate a charge while the area is under the scanning spot and to lose this charge slowly after the scanning spot is passed by. The more frequently each area is passed by the scanning spot, the greater will be the charge that is accumulated on this area and the higher will be the potential on this area, and the brighter will be the light produced while the spot is passing.

It will thus be seen that the oscilloscope is regenerative in nature so as to emphasize signals which repeat at the same place on the screen and to make them much more distinguishable from receiver noise and interference which does not repeat at the same spot on the screen. Putting it in other words, the response to signals which repeat in the same position on successive scans is increased with respect to noise and interference which occurs in random positions. This arrangement thus adds a form of timing and pulse rate selectivity to radar systems equivalent to that obtainable by pulse integration and regeneration in pulse communications systems.

In order to emphasize the effect of signal pulses with respect to total light in a Type A indicating system I have shown a means to modulate both the position and the intensity of electron beam current with the signal input. For this purpose the control electrode $G_1$ is supplied with signal pulses, principally through bypass condenser C, simultaneously with application of the signals to one of the vertical deflecting plates V. For PPI indications the signals would, of course, be applied only to the control electrode $G_1$.

Fig. 2 is a modification of Fig. 1 and differs therefrom primarily in the fact that the system of the invention is now applicable to enhancing the light response characteristic of any periodically repeating synchronously controlled signal wave form. It should be noted that the vertical deflection plates of the cathode ray tube of Fig. 2 are not shown, although such plates may be used in the tube and the connection from such plates to the video amplifier may be omitted. The signal from the receiver is now applied only to the first grid $G_1$ through a video amplifier 11, as in Fig. 1. The operation of the second anode and the screen to provide an improved signal-to-noise ratio in the light response of the screen is substantially the same as described above in connection with Fig. 1. The square wave pulse generator 16 of Fig. 2 is designed to produce pulses during the time the signal pulses from the receiver are applied to the grid $G_1$, at which time a pulse of negative polarity is supplied to the grid of tube 13 via leads 17 of such magnitude as to bias the tube 13 to the cut-off condition. In the intervals between signal pulses, the modulator tube 13 is conductive and the anode potential causes a de-focused spray of electrons to charge the screen to low potentials. During the signal periods, it will be obvious that the screen area struck by the focused beam rises to higher and higher potentials with successive passages of the spot.

An added feature of Fig. 2 is a coupling back from keying tube 13 to amplifier tube 11 in such a manner as to increase the electron beam current in the cathode ray tube while the potential of its second anode A' is low, so as to discharge potentials on the screen S more rapidly.

It should be understood that various modifications may be made in the systems of Figs. 1 and 2, without departing from the spirit and scope of the invention. For example, the action of the potential on the second anode A' can be reversed so that the anode potential is made higher between signal periods than during signal periods. In this way the signals can appear as dark lines on a bright background which may be of some practical advantage, particularly for daytime use.

What is claimed is:

1. In apparatus including a cathode ray tube having a target area and means for developing an electron stream adapted to be projected toward the target area, the method of operation which includes modulating the intensity of the developed stream by signal energy, deflecting the stream synchronously with said modulation and rapidly accelerating the modulated stream substantially solely during periods of modulation, without changing the speed of deflection.

2. In apparatus including a cathode ray tube having a target area and means for developing an electron stream adapted to be projected toward the target area, the method of operation which includes modulating the developed stream by signal energy, deflecting the stream synchronously with said modulation, and accelerating the modulated and deflected stream substantially solely during periods of modulation, without varying the speed of deflection.

3. The method of operating a cathode ray oscilloscope having a fluorescent target and a second anode, which comprises applying periodically recurring signal waves to an electrode of said oscilloscope, raising the potential on said second anode during periods in which said signals are being applied to said oscilloscope, and causing a decrease in the potential on said second anode during intervals between said periods.

4. The method of operating a cathode ray oscilloscope having vertical and horizontal deflection elements, a fluorescent screen and a second anode, which comprises applying periodically recurring pulses of energy of short duration compared to the time intervals between them to said vertical deflection elements, synchronously applying a beam deflecting wave to said horizontal deflection elements, raising the voltage on said second anode during periods in which said periodically recurring pulses are to be applied to said vertical deflection elements, and causing a decrease in said voltage on said anode during intervals between said periods.

5. The method of operating a cathode ray oscilloscope having vertical and horizontal deflection elements, a fluorescent screen, a beam intensity control electrode, and a second anode, which comprises applying periodically recurring pulses of energy of short duration compared to the time intervals between them to said vertical deflection elements, and to said control electrode, synchronously applying a beam deflecting wave to said horizontal deflection elements, raising the voltage on said second anode during periods in which said periodically recurring pulses are to be applied to said vertical deflection elements, and causing a decrease in said voltage on said anode during intervals between said periods.

6. The method of operating a cathode ray oscilloscope having a light responsive screen, a beam intensity control electrode, beam deflection elements, and a second anode, which comprises applying periodically recurring waves to said control electrode, synchronously applying a deflecting wave to said beam deflection elements, and synchronously modulating the voltage on said second anode.

7. A system for visibly indicating periodically recurring electrical waves, including a cathode ray tube having a cathode, an intensity control electrode, a first anode, beam deflecting electrodes, a second anode and a light responsive target, a source of saw-tooth waves coupled to said beam deflecting electrodes, a circuit for applying said periodically recurring waves to said intensity control electrode, and means under control of said circuit for varying the voltage on said second anode in substantial synchronism with the periods during which said waves are applied to said control electrode.

8. A system for visibly indicating periodically recurring electrical waves, including a cathode ray tube having a cathode, a first anode, vertical and horizontal pairs of deflection electrodes, a second anode and a light responsive target, a source of sweep waves coupled to one pair of said deflection electrodes, a circuit for applying said periodically recurring waves to said other pair of deflection electrodes for time intervals less than the total time, and means for synchronously raising the voltage on said second anode substantially solely during said time intervals.

9. A system for visibly indicating periodically recurring electrical waves, including a cathode ray tube having a cathode, an intensity control electrode, a first anode, vertical and horizontal pairs of deflection electrodes, a second anode and a light responsive target, a source of sweep waves coupled to one pair of said deflection electrodes, a circuit for applying said periodically recurring waves to said intensity control electrode and to said other pair of deflection electrodes for time intervals less than the total time, and means for synchronously raising the voltage on said second anode substantially solely during said time intervals.

10. In apparatus including a cathode ray tube having a cathode for producing an electron beam and a light responsive target area, a circuit for modulating the electron beam in accordance with signal energy, a pulse generator, a source of sweep waves under control of said pulse generator for deflecting said beam, and an electron discharge device system under control of said pulse generator for accelerating the modulated beam substantially solely during periods of modulation and without affecting the operation of said source of sweep waves.

11. In apparatus including a cathode ray tube having a cathode for producing an electron beam, a light responsive target, an anode located between said cathode and target, and a translucent backing adjacent said target but insulated therefrom, a circuit for maintaining said anode at a positive potential and said backing at a lesser potential relative to said cathode, a source of periodically recurring waves for modulating the electron beam, and an electron discharge device circuit under control of said source for raising the potential on said anode substantially solely during periods of modulation.

12. Apparatus in accordance with claim 11, characterized in this that said electron discharge device circuit includes a pulse generator and a vacuum tube under control of the output of said pulse generator, there being a connection from the output electrode of said vacuum tube to the anode of said cathode ray tube.

13. In apparatus including a cathode ray tube having a cathode for producing an electron beam, a first anode, beam deflecting electrodes, a second anode, a light responsive screen, and a translucent backing adjacent said screen but insulated therefrom, a circuit for maintaining said second anode at a potential which is positive relative to said first anode and said backing, a source of periodically recurring waves for modulating said electron beam in accordance with signals, a pulse generator under control of said source for generating pulses in response to the occurrence of said waves, a sweep source under control of the output of said generator, connections from said sweep source to said beam deflecting electrodes, and a vacuum tube having an electrode coupled to said second anode and having grid and cathode electrodes coupled to the output of said pulse generator, whereby the occurrence of pulses in the output of said pulse generator affects the conductivity of said vacuum tube and hence varies the potential on said second anode in synchronism with the modulation of said beam.

14. In an oscilloscope system comprising a cathode ray tube having a fluorescent screen, means for obtaining increasing light intensity per unit of signal current, with increasing average current flow to areas of the fluorescent screen of an oscilloscope comprising a signal input circuit for said tube, means to charge the areas to low potentials during selected repetitive time periods, and means responsive to signals in said input circuit in other time periods and responsive to current flow for charging the same areas to higher potentials.

15. In an oscilloscope indicating system comprising a cathode ray tube having a cathode for producing a stream of electrons, a fluorescent screen, a backing layer, and an electrode positioned between said cathode and screen and normally maintained at a low potential relative to said cathode, means establishing a large dielectric capacity between said screen and backing layer, a signal input circuit for said tube, means including said cathode and said electrode for spraying said screen with an unfocussed stream of electrons from said cathode during time periods not occupied by input signals, and means to scan portions of said screen with a focussed stream of electrons and to simultaneously increase said potential on said electrode during time periods occupied by input signals.

16. In apparatus including a cathode ray tube having an evacuated envelope with a straight portion and a portion with diverging sides, a target located at the widest end of the envelope, a cathode near the other end of the envelope, a backing adjacent said target but insulated therefrom, a control electrode adjacent said cathode, a first anode near said cathode and positioned in the path of the electron stream from said cathode to said target, a second anode comprising a metallic coating on the diverging sides of said envelope, means for maintaining said second anode at a positive potential and said backing at a lesser potential relative to said cathode, means coupled to said control electrode for applying modulation thereto, and means for modulating the potential on said second anode in synchronism with the modulation applied to said control electrode.

17. In apparatus including a cathode ray tube having a cathode, a fluorescent screen, an anode located between said cathode and said screen, and a translucent backing located adjacent said screen but insulated therefrom, means for maintaining said anode at a positive potential and said backing at a constant negative potential relative to said cathode, means for applying signal energy to still another electrode of said cathode ray tube, and means for changing the potential of said anode substantially solely during periods in which signal energy is applied to said tube.

18. In apparatus including a cathode ray tube having a cathode, a light responsive target and first and second anodes located between said cathode and target, and a translucent backing adjacent said target but insulated therefrom, a circuit for maintaining said first and second anodes at positive potentials and said backing at a negative potential relative to said cathode, means for applying signal energy to still another electrode of said tube, and means for changing the potential of said second anode relative to said cathode without substantially changing the potential of said first anode relative to said cathode, substantially solely during periods in which signal energy is applied to said tube.

19. In apparatus including a cathode ray tube having a cathode, a target, and first and second anodes located between said cathode and target, a circuit for maintaining said first and second anodes at positive potentials relative to said cathode, a circuit for modulating the electron stream developed by said cathode, and means for synchronously varying the potential on said second anode without substantially varying the potential of said first anode relative to said cathode.

CLARENCE W. HANSELL.

REFERENCES CITED

The following references are of record in the file of this patent:

UNITED STATES PATENTS

| Number | Name | Date |
| --- | --- | --- |
| 2,004,790 | Hehlgans | June 11, 1935 |
| 2,074,737 | Wolff | Mar. 23, 1937 |
| 2,081,942 | Lubcke | June 1, 1937 |
| 2,188,647 | Busse | Jan. 30, 1940 |
| 2,197,625 | Teves et al. | Apr. 16, 1940 |
| 2,222,943 | George | Nov. 26, 1940 |
| 2,234,830 | Norton | Mar. 11, 1941 |
| 2,241,256 | Gould | May 6, 1941 |
| 2,313,967 | Read, Jr. | Mar. 16, 1943 |
| 2,363,810 | Schrader et al. | Nov. 28, 1944 |
| 2,369,631 | Zanarini | Feb. 13, 1945 |

FOREIGN PATENTS

| Number | Country | Date |
| --- | --- | --- |
| 426,706 | Great Britain | Jan. 5, 1934 |
| 503,893 | Great Britain | July 5, 1938 |